United States Patent Office 2,824,860
Patented Feb. 25, 1958

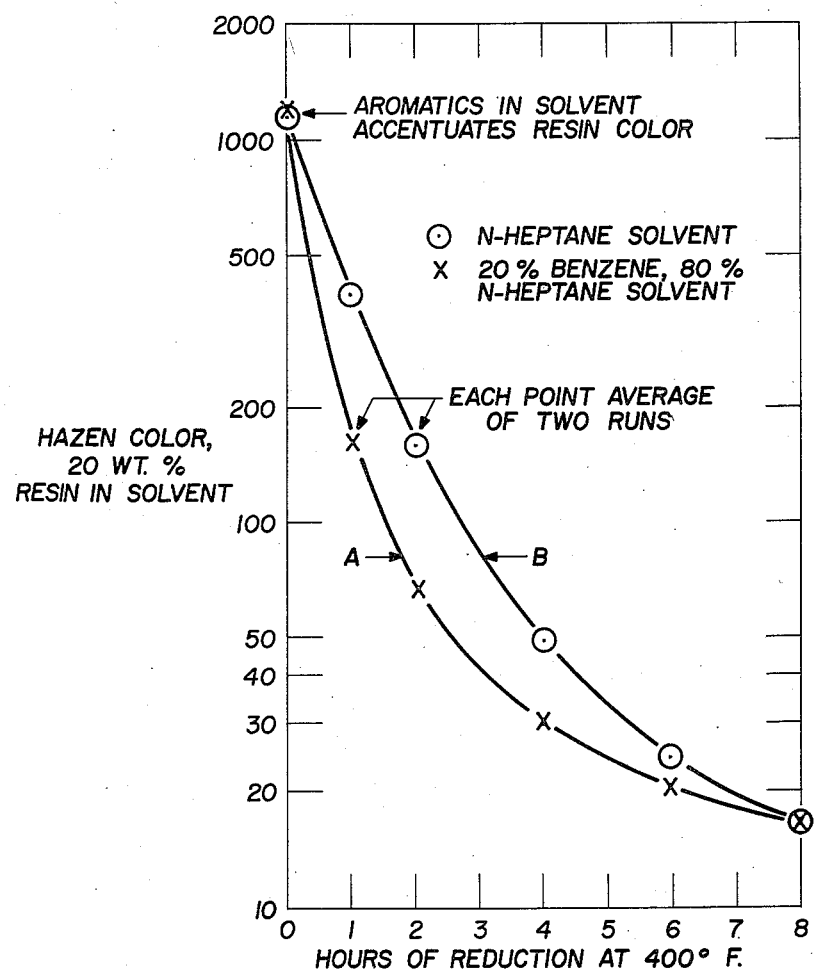

2,824,860

HYDROGENATED RESIN AND PROCESS THEREFOR

Clyde Lee Aldridge, Baker, and Augustus Bailey Small, Baton Rouge, La., assignors to Esso Research and Engineering Company, a corporation of Delaware Application June 29, 1955, Serial No. 518,878

5 Claims. (Cl. 260—82)

This invention relates to improved petroleum resins, and methods of producing the same. More particularly, it relates to a combination process of making light colored hydrocarbon resins from cracked petroleum fractions and simultaneously hydrogenating unsaturated hydrocarbons to saturated hydrocarbons. The invention further relates especially to improved methods of producing light colored resins at an accelerated rate by hydrogenating aromatic hydrocarbons to cycloparaffinic hydrocarbons while simultaneously hydrogenating resins from steam-cracked petroleum fractions dissolved therein.

Heretofore, numerous attempts have been made to produce resins from "cracked" petroleum fractions such as cracked naphthas by various methods, such as by treatment with activated clays, Friedel-Crafts catalysts, or by simple heating, etc. However, such resins are generally high in unsaturation and dark in color. This means that from a commercial point of view they have a very limited application and cannot compete in quality with lighter colored resins made from other types of materials but which are more expensive. Recently it has been found that somewhat lighter colored resins are produced if the cracking is (a) in the presence of about 60–95 mol percent steam and (b) in the substantial absence of cracking catalysts. However, such resins are generally dark yellow to amber in color and must be further treated if a light yellow or water-white resin is desired. The resins of the present invention may be produced, for example, from petroleum naphtha fractions comprising mixtures of numerous homologues of materials falling in at least 3 or 4 major chemical classes, e. g., mono-olefins, diolefins, aromatic hydrocarbons, cyclic mono-olefins and cyclic diolefins, and others.

According to the present invention, it is now possible to prepare light colored or substantially water-white resins from resins from steam-cracked petroleum fractions (and especially from steam-cracked naphthas). The water-white resin of the present invention is a hydrogenated petroleum hydrocarbon resinous polymerization product, optionally but preferably of a substantially cyclodiene-free steam-cracked petroleum fraction and boiling within the range of about 50° F. to about 450° F.

The steam-cracked naphtha or equivalent petroleum fraction, preferably after special treatment to reduce the cyclic diolefin content to less than 5% and, preferably to less than 2%, is subjected to special polymerization conditions, and the resulting polymer resin is finally hydrogenated to a light color (a Hazen color of less than about 300) and preferably water-white (a Hazen color of 0 to 100–200) by dissolving said resin in an aromatic hydrocarbon, the presence of which has suprisingly been found to accelerate the hydrogenation rate.

The invention will be best understood by reference to the accompanying drawing in which the single figure is a graphical representation depicting the acceleration of the resin hydrogenation rate when the hydrogenation is accomplished in the presence of an aromatic hydrocarbon-containing solvent.

According to one embodiment of the present invention, a light colored petroleum hydrocarbon resin is prepared from a steam-cracked petroleum fraction boiling between about 50° to about 500° F., preferably between about 100° to about 400° F. by heat-soaking said fraction at a temperature of about 180° to about 240° F. for a time sufficient to dimerize cyclodienes, recovering therefrom a substantially cyclodiene-free distillate fraction, and subjecting this fraction to Friedel-Crafts polymerization at a temperature of about −150° F. to about +200° F. for a time sufficient to produce a resin having a softening point within the range of about 85°–250° F. (preferably about 100°–125° F. to about 225°–250° F.). The resin is then stripped to remove unreacted material. The unhydrogenated resin may be advantageously further stripped to a softening point of about 125° F. to 225° F. (and preferably to about 175° F. to 200° F. or 225° F.). This has the advantage of producing a higher softening point resin but the disadvantage of decreasing the resin yield. For example, the resin may be stripped under about 0.5–50.0 mm. of Hg absolute for 10–30 minutes at about 400°–450° F. to about 500°–550° F. However, broader ranges according to the nature of the resin and softening point desired would include about 5–60 minutes at about 300° F. to 700° F., especially about 340–350° to about 650–680° F. Temperatures of 350° F. to 500° F., especially 400° F. to 450° F., times of about 10 to 30 minutes, especially 15 to 20 minutes, and absolute pressures of 0.5 to 10.0 (and especially 1 to 5) millimeters of mercury absolute are preferred. The resin is then dissolved in a light aromatic hydrocarbon containing solvent such as benzene and hydrogenated under a pressure of about 100–500 p. s. i. g. to about 2000–6000 p. s. i. g. (e. g., 3000 to 5000 p s. i. g.) at a temperature of about 100°–300° F. to about 650°–800° F. (e. g., 350°–600° F.) in the presence of aromatic hydrocarbons whereby a light colored resin having a color of less than about 500, and preferably less than about 300 on the Hazen scale is produced at an accelerated rate and the aromatic hydrocarbons are converted to cycloparaffinic hydrocarbons.

In a preferred operation according to another embodiment of the invention, a substantially water-white hydrocarbon resin having a Hazen color of not more than 50–100 is obtained from a steam-cracked naphtha fraction boiling within about 50° to 450° F., which fraction consists essentially of about 15–55 wt. percent aromatic hydrocarbons, about 5–15 wt. percent of cyclodienes, about 10–15 wt. percent aliphatic diolefins, about 15–40 wt. percent of mono-olefins, and about 0–5 wt. percent unreactive paraffins. The water-white resin is produced by the process which comprises thermally soaking the above fraction at about 180° F. to about 240° F. for about 2–24 hours to dimerize sufficient cyclodienes that the fraction contains less than 5%, and preferably less than 2%, cyclodienes, distilling the resulting product to remove said dimerized cyclodienes as bottoms, and recovering the overhead distillate. The overhead distillate is then subjected to continuous polymerization in the presence of an aluminum halide catalyst for a residence time of about 0.1 to about 5.0 volumes of feed per volume of reactor per hour (advantageously about 0.3–2.0 v./v./hr., preferably 0.5–1.0 v./v./hr) at a temperature of about −150° F. to about +250° F. to polymerize the reactive aliphatic diolefins and mono-olefins, etc. whereby to produce a resin having a softening point of about 150° F. to about 250° F. The resin is then steam-stripped to remove unreacted monomer, diluent and other volatile materials. It may be optionally further stripped to a softening point of about 185°–215° F. up to about 250° F. as hereinbefore described and then dissolved in a solvent comprising an aromatic hydrocarbon, such as benzene, alkylated benzenes, such as toluene, xylenes, etc. The preferred aromatic hydrocarbon is benzene, in which case the ratio to the resin on a weight basis is generally about 300–500 (e. g. 400) parts of benzene to 100 parts of resin. It is preferred that the aromatic hydrocarbon boil below about 500° F. and especially below about 475° F. Such an aromatic hydrocarbon is a better solvent for petroleum resins than are, for example, paraffins.

The aromatic hydrocarbon may also be partially replaced by quantities of saturated hydrocarbons, such as pentane, hexane, heptane, octane, nonane, cyclohexane, etc., which contain the above amounts of aromatic hydrocarbons. For example, the aromatic hydrocarbons may be diluted with about 0–10 times (preferably 0–4 times) their amounts of saturated hydrocarbons, such as cycloparaffins and/or especially paraffinic hydrocarbons. In such a case, the saturated hydrocarbons may be recovered and recycled as the saturated portion of the resin solvent. This is especially advantageous in the case of naphthenes formed by the hydrogenation. The resin solution is then subsequently hydrogenated at about 100° to 800° F., advantageously about 300° to 650° F., preferably about 350–500° F. (e. g., 450–500° F.), under a pressure of about 500–1000 to about 4000–5000 p. s. i. g., an advantageous range being from about 1000–2000 p. s. i. g. to about 3000–6000 p. s. i. g. (e. g. 3000 or 4000 p. s. i. g.). The aforesaid hydrogenation is accomplished in the presence of a hydrogenation catalyst such as a group VIII metal containing catalyst, i. e., a reduced nickel catalyst such as a Raney or Harshaw nickel catalyst, for a time sufficient to obtain a water-white resin, i. e., for about 8 hours or less, advantageously 2 to 8 hours, preferably about 3 to 6 hours. The aforesaid hydrogenation also converts substantially all unsaturates, e. g., aromatics, etc., to saturated hydrocarbons such as cycloparaffins (e. g., cyclohexane). The hydrogenated resin formed has a color of less than about 100 and preferably less than about 50 on the Hazen scale.

If the softening point of the hydrogenated resin is desired to be over about 150° F., 185° F., or even 200° F., it may be sometimes desirable to strip the hydrogenated resin to raise the softening point from 150° to 175°–225° F., from 185° F. to above 210°–215° F., from 200° F. to above 215°–225° F., etc. The particular use to which the light colored resin is to be applied will determine whether a final stripping step is desirable or not. The stripping conditions will vary according to the resin melting point desired but will generally vary from about 5–60 minutes (especially about 10–30 minutes) at temperatures of about 380°–600° F. (advantageously 400°–550° F., and preferably 400°–500° F.).

As regards the starting materials, for the purposes of the present invention, it is preferred to use as polymerization feed stock a steam-cracked naphtha, kerosene, admixture of lighter ends with light gas oils, etc. having a boiling range of about 50° to about 450–500° F., preferably, 100°–400° F., from which essentially all of the $C_4$ hydrocarbons and lighter hydrocarbons have been removed, although one may also use one or more narrower fractions such as the 100°–300° F. fraction, the 300°–450° F. fraction, etc. It is also sometimes advantageous to remove the isoprene from the naphtha.

Although the actual content of various chemical classes of hydrocarbons present may vary somewhat according to the type of crude oil from which the gas-oil fraction is being cracked and according to the steam cracking conditions and fractionation conditions; nevertheless, in general, a desirable essentially debutanized steam-cracked naphtha fraction will have approximately the following range in composition:

| | Percent by weight |
|---|---|
| Benzene | 5–20 |
| Toluene | 5–15 |
| Higher aromatic hydrocarbons ($C_{9-12}$) | 0–25 |
| Cyclic diolefins | 5–15 |
| Cyclic monoolefins | 5–10 |
| Aliphatic diolefins | 10–30 |
| Aliphatic monoolefins | 30–60 |
| Paraffins | 0–5 |

The above-described steam-cracked petroleum fraction may thus be considered a suitable polymerizable material for the present invention. This fraction is then preferably subjected to a heat-soaking step, or other suitable treatment for removing at least 95%, and preferably, at least 98%, of the cyclic diolefins, i. e., chiefly cyclopentadiene and its relatively close homologues, such as methyl cyclopentadiene. Such a heat-soaking may be effected at a temperature of about above 170° F., e. g. about 180°–240° F. for about 2–24 hours. At lower temperature ranges, i. e., 180° F., the time may be about 12–24 hours, whereas, at higher temperatures of about 240° F. the time will be much shorter, i. e., about 2–4 hours. Generally, it is preferred to use a temperature of about 200°–250° F. (especially 210°–230° F.) with a heat-soaking time of about 5–10 hours.

After the above heat-soaking step which chiefly causes the dimerization of the cyclopentadienes, the product is distilled to remove the dimers as bottoms. The product is thus substantially similar to the original raw material steam-cracked hydrocarbon fraction except that it is substantially free of cyclodienes such as cyclopentadiene. The distillate contains less than 5 weight percent cyclodienes and preferably less than about 2 weight percent cyclodienes. The product is then subjected to polymerization with a Friedel-Crafts catalyst such as aluminum chloride, boron fluoride, stannic chloride, titanium tetrachloride, aluminum bromide, or other catalysts similar to Friedel-Crafts catalysts and catalytically active complexes thereof. The above polymerization may be effected at a temperature of about −150° F. to about +200° F., preferably at about 70°–130° F.

The amount of catalyst to be used will vary somewhat inversely according to the temperature, and according to the composition of the polymerization feed, but normally should be about 0.1–5.0% (preferably 0.5–2.0%) by weight based on the approximate proportion of polymerizable constituents in the feed. The polymerization, for simplicity of operation may be applied directly to the decyclopentadienized distillate without removal of any of the volatile constituents thereof if they are inert to the polymerization catalyst. After the polymerization has been effected, the resulting resin is recovered by normal distillation and/or preferably steam-stripping, stripping with an inert gas such as nitrogen (under pressure slightly above atmospheric or under vacuum) to remove volatile solvents and low molecular weight oily contaminants.

The polymer-resin prior to hydrogenation will generally have a diluted Gardner color (at 50 weight percent resin in toluene) ranging from about 1–12 (but usually 6–10), a softening point range from about 85°–100° to about 250° F., usually about 150°–225° F., and an iodine number (ASTM) of about 50–200 to about 400, usually about 200–250 to about 300.

Normally it would appear desirable to redissolve the above resin in a hydro-inert solvent such as hexane or paraffinic hydrocarbon fraction of somewhat similar boiling range, to reduce ancillary hydrogen consumption.

However, by the present invention, the hydrogenation of the resin has been surprisingly found to be accelerated by employing preferably about 1–20 parts by weight of an aromatic hydrocarbon solvent, such as benzene, toluene, xylenes and mixtures thereof, or such aromatic hydrocarbons in admixture with about 0–10 parts by weight of paraffinic or naphthenic-type hydrocarbons per part of aromatic hydrocarbon. For ease in handling, one part by weight of the resin is preferably dissolved in about 0.5–20.0 (especially 1–15) parts by weight of the solvent per part by weight of the resin.

The hydrogenation is then effected under a pressure of about 100–6,000 p. s. i. g., advantageously about 500–5,000 p. s. i. g., and most preferably from about 1,000–2,000 to 4,000 p. s. i. g., at temperatures of 200°–800° F. (advantageously about 300°–650° F., and preferably at 350°–550° to 600° F.), e. g. 400° F. for a few minutes up to 30 hours or more, but preferably for about 1–20 hours, and most advantageously for about 5–10 hours, in the presence of a suitable hydrogenation catalyst to include groups VI and VIII metals and compounds or other catalysts, such as nickel, reduced nickel, nickel sulfide, a Harshaw nickel catalyst, copper chromite, cobalt molybdate, molybdenum sulfide, or various catalysts supported on light porous or granular particles of large surface area, such as alumina, pumice, clays, charcoal, etc. The hydrogenation may be carried out batchwise or continuously. The amount of catalyst in a batch operation generally is about 5–50% by weight based on the amount of resin containing solution being subjected to hydrogenation. If continuous hydrogenation is used, the feed rate of resin solution through the catalyst bed should be about 0.05–5.0 (preferably about 0.1–1.0 v./v./hr., e. g. 0.5 v./v./hr.) volumes of liquid feed per volume of reactor per hour. The extent of the hydrogenation may be determined by either the pressure drop caused by hydrogen consumption or by periodic examination of samples of the resin solution during the course of the hydrogenation.

When the hydrogenation has been completed, the resin solution may be either stored and shipped as such or may be subjected to stripping advantageously under low pressure, e. g., steam stripping or vacuum stripping, to remove the volatile solvent as well as any other low molecular weight substances present. It is optional, however, that the hydrogenation process be effected under conditions sufficiently stringent only to form a light colored resin or a resin which is preferably substantially water-white in color but without any large reduction in softening point of the resin or any other substantial degradation thereof. This may be accomplished in any conventional manner, such as by stripping the resin under about 0.5–100 mm. (especially 1–10 mm.) of mercury pressure absolute for about 10–30 minutes at about 340°–680° F. (advantageously 482° F.).

The resulting hydrogenated resin, according to the invention has a softening point of about 185° F. to about 250° F., an iodine number about 400 (preferably below about 100), a Gardner color in the 100% solids state, of 1 or preferably less than about 1 and on the Hazen scale of less than 300, advantageously less than 100–200 and preferably less than about 50), and is, therefore, very light colored and preferably water-white. The decyclopentadienizing treatment applied before polymerization, and the use of a Friedel-Crafts catalyst to effect the polymerization cooperate to give a polymer resin particularly susceptible to decolorizing by a hydrogenation treatment. This effect is considerably enhanced in accordance with the present invention by dissolving the resin in a solvent consisting essentially of aromatic hydrocarbons with about 0–10 (especially 0–5) parts by weight of saturated hydrocarbons such as saturated aliphatic hydrocarbons (e. g. hexane, heptane or octane) or naphthenes (e. g. cyclohexane) per part by weight of aromatic hydrocarbon. The saturated hydrocarbon component is preferably supplied by recycling a portion of the recovered hydrogenated aromatic solvent.

The resulting hydrogenated resin is soluble in petroleum hydrocarbons, such as hexane and mixed paraffinic hydrocarbons of the naphtha boiling range, and also in aromatic hydrocarbons, such as benzene, toluene, xylene, etc., or in mixed aromatic fractions as obtained by thermal or catalytic cracking of petroleum gas oil fractions. However, these resins are either substantially insoluble or only have a low solubility in low molecular weight organic solvents such as methanol, ethanol, isopropanol, acetone, methylethylketone, ethyl ether, etc. In general, the molecular weight of the resin is about 500–3,000 (generally about 1,000–1,500) and the iodine number (ASTM) generally is from about 0 to 100–150.

It is not intended that this invention be limited unnecessarily by speculation as to any theory as to mechanism of the operation of the invention. However, as a possible explanation, it is suggested that the added aromatic solvent after polymerization reduces side reactions which interfere with color removal and thereby the present invention accelerates hydrogenation and the reduction of the resin to a more desirable light color. Accordingly, by the invention, the subsequent hydrogenation is enabled to more easily eliminate the color with little change in either softening point or molecular weight.

Further objects, advantages, and details of the invention will be understood from the following examples wherein reference will be made to the drawing:

*Run A.*—The feed or raw material which was subjected to batch polymerization was made by steam-cracking a gas oil petroleum fraction derived from a paraffinic type crude, the cracking being carried out at a temperature of about 1200°–1300° F. and pressure of 10–20 p. s. i. g. in the presence of about 70–75 mol percent of steam.

The approximate analysis of the resultant steam-cracked fraction, after debutanizing, was as follows:

| | Volume percent |
|---|---|
| $C_5$ cyclodiolefins | 5 |
| Aliphatic $C_5$ diolefins | 5 |
| $C_5$ olefins | 20–21 |
| $C_{6-8}$ diolefins | 8–10 |
| $C_{6-8}$ | 14–15 |
| $C_{9-12}$ diolefins | 3 |
| $C_{9-12}$ olefins | 4 |
| Benzene | 15 |
| Toluene | 10 |
| Xylenes | 2–3 |
| $C_{9-12}$ aromatics | 5–6 |
| Paraffins | 3 |

The above steam-cracked fraction was then subjected to further distillation to remove substantially all of the isoprene overhead and also to remove most of the $C_8$ and higher hydrocarbons as bottoms.

The product now had approximately the following analysis:

| | Volume percent |
|---|---|
| $C_5$ paraffins | 1 |
| $C_5$ cyclic diolefins | 6 |
| $C_5$ piperylene (cis and trans) | 6 |
| $C_5$ tert. olefins | 8 |
| $C_5$ cyclopentene | 2 |
| $C_5$ other aliphatic olefins | 1 |
| $C_6$ benzene | 24 |
| $C_6$ hexadiene | 8 |
| $C_6$ cyclohexene | 6 |
| $C_6$ paraffins | 2 |
| $C_6$ N-olefins | 13 |
| $C_6$ tert. olefins | 5 |
| Toluene | 7 |
| $C_7$ diolefins (mostly aliphatic) | 1 |
| $C_7$ cyclic olefins | 1 |
| $C_7$ N-olefins | 5 |
| $C_7$ tert. olefins | 2 |
| $C_{8-9}$ olefins and diolefins (including trace of aromatics) | 2 |

This product was then subjected to heat-soaking at 220° F. for about 6–8 hours to effect dimerization of cyclodienes including cyclopentadiene and its lower alkyl homologues such as methyl cyclopentadiene. The resulting product was next subjected to distillation to remove the dicyclopentadiene-type products as bottoms. The overhead was condensed and analyzed and found to contain less than 2% cyclodienes as compared to 6% cyclodienes prior to dimerization and was subjected to Friedel-Crafts continuous polymerization at a temperature of about 100°–120° F. for a residence time of one volume of feed per volume of reactor per hour (1 v./v./hr.), using 1% by weight of aluminum chloride (based on the total feed) as catalyst. The resulting polymerization product was then subjected to the types of washing and recovery treatments, and hydrogenated under the various conditions as discussed in more detail hereinafter.

perature of about 100°–120° F. for two hours using 1% by weight of aluminum chloride (based on the total feed) as catalyst.

The polymerization product is produced likewise under the same polymerization conditions as in run A, supra. The resulting polymerization product is then stripped until it is substantially dry with $N_2$ gas at 500° F. under 1–2 millimeters absolute pressure. Prior to hydrogenation the polymerization product is dried and then diluted with either an equal volume of n-heptane or an equal volume of a mixture of 50 weight percent n-heptane and 50 weight percent benzene as hereinafter shown. The results are compiled in the following table, including Example II and runs 1–8:

*Hydrogenation of resin (Example I)*

| Test No. | Unhydrogenated Resin | | | Hydrogenation | | | Hydro-Resin (a) | | Naphthene Recovered (k) |
|---|---|---|---|---|---|---|---|---|---|
| | Resin Prepared by (b) and (c) | Soft. Pt., °F. | Gardner Color (j) | P. s. i. g., $H_2$ | Temp., °F. | Time, Hrs. | Soft. Pt., °F. | Gardner Color (j) | |
| Ex. II | Resin (i) | 202 | 11 | 3,500 | 450 | 5 | 190 | <1 (d) | Cyclohexane. |
| Run 1 | Resin (h) | 217 | 11 | 3,500 | 450 | 12 | 190 | <1 (d) | |
| Run 2 | Resin (i)+10% MCPD | 227 | 16 | 1,300 | 536 | 4 | 220 | 5.0 (f) | Do. |
| Run 3 | Resin (h)+10% MCPD | 227 | 16 | 1,300 | 536 | 9 | 204 | 5.0 (f) | |
| Run 4 | Resin (i)+15% CPD | 234 | 10.5 | 1,300 | 480 | 3 | 228 | 5.0 (f) | Do. |
| Run 5 | Resin (h)+15% CPD | 234 | 10.5 | 1,300 | 482 | 14 | 214 | 4.5 (f) | |
| Run 6 | Resin (i)+10% DMCPD (g). | 227 | 12.5 | 2,900 | 500 | 6 | 190 | 1.0 (e) | Do. |
| Run 7 | Resin (h)+10% DMCPD (g). | 227 | 12.5 | 2,900 | 500 | 9 | 205 | 1.0 (e) | |
| Run 8 | Resin (h)+4% CPD+3.5% MCPD. | 221 | 13.5 | 1,800 | 527 | 10 | 207 | 5.0 (f) | |

(a) Hydrogenated (hydro-) resin recovered by $N_2$ stripping @ 350°–365° F. (btm. temp.) at 10–15 mm. absolute.
Resins by (b) continuous polymerization as in run B; and (c) contain less than 2% cyclodienes.
(d) Water-white.
(e) Yellowish tint.
(f) Amber.
(g) Dimerized MCPD.
(h) Diluent of 100% n-heptane.
(i) Diluent of 50% n-heptane and 50% benzene.
(j) Color of a 50% solution.
(k) Recovered from diluent after hydrogenation.

EXAMPLE I

A sample of the above-described polymerization product is steam stripped and the resin is dried and then diluted with an equal volume of toluene. The resin is then hydrogenated at 450° F. for 7 hours under 3500 p. s. i. g. of hydrogen. The Gardner color of a 50% solution of the hydrogenated resin is less than 1 and the softening point of the resin is 190° F., the solvent distilled from the effluent showing 97% conversion of toluene into methyl cyclohexane.

EXAMPLE II

The following data is presented to show that the color of hydrogenated petroleum resins prepared from substantially cyclodiene-free distillates are superior to the color of resins prepared from feed stocks containing substantial amounts of cyclodienes.

*Run B.*—The feed or raw material which is subjected to continuous polymerization is made by steam-cracking a gas oil petroleum fraction derived from a paraffinic type crude; the cracking conditions, pressure and mol percent of steam being identical with run A, supra, and the approximate analysis of the steam-cracked naphtha after debutanizing also being identical.

The steam-cracked naphtha is then subjected to further distillation as in run A to remove substantially all of the isoprene, and the resulting product also has the identical analysis as in run A, i. e., the $C_5$ cyclic diolefins were present in an amount of 6 volume percent, etc.

This product is then subjected to heat soaking at 200° F. for about 6 to about 8 hours to effect dimerization of cyclodienes such as cyclopentadiene and its lower alkyl homologues such as methylcyclopentadiene. The resulting product is then subjected to distillation to remove cyclopentadienes as bottoms. The overhead is condensed and subjected to Friedel-Crafts polymerization at a temperature of about 100°–120° F. for two hours using 1% by weight of aluminum chloride (based on the total feed) as catalyst.

By comparing Example II and run 1, it will be noted that the use of an aromatic hydrocarbon (e. g. benzene) in the solvent decreases the required time to obtain the same quality product. For instance, in Example II wherein the solvent contains benzene as well as heptane, the time for producing a water-white resin is only 5 hours compared to run 1 wherein the required time for the same quality product is 12 hours because of the fact that heptane is the sole solvent. In like manner, the acceleration of the hydrogenation rate is demonstrated in runs 2, 4, and 6 as compared to runs 3, 5 and 7, respectively.

In Example II and in runs 2, 4, and 6, the benzene is converted to cyclohexane which is advantageous since, on a cost basis, the benzene and cyclohexane are approximately as follows:

| Material | Market Value |
|---|---|
| Benzene (nitration, tank), per lb | 5.5¢ |
| Cyclohexane (technical tank), per lb | 8.6¢ |

Thus, it will be noted that not only are such aromatic compounds as benzene converted into more valuable cyclo-paraffinic hydrocarbons, such as cyclohexane, but also the hydrogenated resin from a steam-cracked hydrocarbon feed containing less than 2% cyclodienes has a Gardner color of less than 1 and is water-white (see Example II and run 1), whereas, in all other cases where the cyclodiolefin content of the resin feed is over 5 wt. percent, the color varies from yellowish to amber and is never a "water-white" resin upon hydrogenation thereof. It is also apparent that a substantially water-white hydrocarbon resin is prepared when the feed to the polymerization zone contains less than about 5 wt. percent (and preferably less than about 2 wt. percent) of cyclodiolefins. For instance, only Example II and run 1, wherein the polymerization feeds contain less than 2 wt. percent cyclodienes, produce a water-white resin upon hydrogenation. However, even the inclusion of as little as 7.5–10% cyclodienes such as methyl-cyclopentadiene as in runs 2, 3, 4 and 5 results in a resin having a pronounced amber color. Furthermore, when the resin feed contains a combination of 4% cyclopentadiene and 3.5% methyl cyclopentadiene, the color of the resin is also amber and has a Gardner color of 5 (see run 8).

The approximate relative market values of a "water-white" petroleum resin and an unhydrogenated petroleum resin are as follows:

| Material | Approximate Market Value |
| --- | --- |
| Unhydrogenated Petroleum Resin, per lb | $0.06 |
| Water-white Petroleum Resin, per lb | $0.12–0.20 |

EXAMPLE III

The same general procedure for producing the petroleum resin prior to the hydrogenation step as in Example II was employed. To a 3-liter bomb was charged 83 grams of unhydrogenated resin, 328 grams of benzene and 250 grams of Harshaw nickel catalyst. Hydrogenation was carried out at 3000 p. s. i. g. hydrogen pressure and about 400° F. for 8 hours. The solvent was distilled from the effluent and was found to be cyclohexane as shown in the following table:

| Material | Density, $d_4^{25}$ | Refractive Index, $n_D^{20}$ |
| --- | --- | --- |
| Pure Benzene | 0.875 | 1.5001 |
| Pure Cyclohexane | 0.772 | 1.4259 |
| Solvent Distillate from Effluent | 0.766 | 1.4245 |

EXAMPLE IV

Two series of runs were made according to the procedure of Example II except that the solvent during the hydrogenation was a mixture of 20% benzene and 80% n-heptane in one instance and 100% n-heptane in the other. Also, the hydrogenation was by methanized hydrogen in the presence of a Harshaw nickel catalyst at 400° F. and at 3000 p. s. i. for the times indicated. The results of these runs are graphically illustrated in the drawing in which curve A depicts changes in resin Hazen color when hydrogenating in the presence of the mixture of 20% benzene and 80% n-heptane as the resin solvent whereas curve B depicts changes in resin color when hydrogenating in the presence of n-heptane as the sole resin solvent.

From the above curves, it is shown that under exactly the same operating conditions to hydrogenate a petroleum resin to a Hazen color of 66, only two hours of reaction time were required in the presence of the mixture of benzene and n-heptane. However, where the hydrogenation was in the presence of n-heptane alone, the same Hazen color of 66 was obtained only after reaction for 3.4 hours while at 2 hours the Hazen color was 158.

Other advantages of employing aromatic compounds as solvents for the hydrogenation in addition to the manifest economic advantage gained by the concurrent hydrogenation of two materials in the same equipment are; the fact that aromatic compounds are superior solvents for certain components of the resin; better purity cycloparaffins (such as cyclohexane) are made according to the present invention than by other methods (such as by extraction from petroleum streams); the presence of aromatics such as benzene makes "over-hydrogenation" of the resin for special uses less likely; and aromatic hydrocarbons and especially benzene are available in the average refinery in high purity with low sulfur content (as compared to paraffinic hydrocarbons). This greatly extends the life of the hydrogenation catalyst which becomes deactivated if contaminated with sulfur.

As beforementioned, light refinery streams containing aromatics with or without small quantities of unsaturated aliphatics may be used. These latter hydrocarbons are upgraded markedly in odor and in oxidation stability. Such hydrogenated materials are useful as insecticide solvents, lighter fluids, paint thinners, etc.

While there are above described a number of specific embodiments of the present invention, it is obviously possible to produce still other embodiments and various equivalent modifications and variations thereof without departing from the spirit of the invention or the scope of the appended claims.

What is claimed is:

1. A process of preparing improved petroleum resins at a rapid rate which comprises polymerizing a substantially cyclodiene-free steam cracked petroleum fraction boiling within the range of about 50° F.–450° F. to form a resinous polymer, stripping the thus formed resin to remove unreacted material and to increase the softening point thereof, dissolving said resin in an aromatic hydrocarbon containing solvent in an amount sufficient to materially increase the rate of hydrogenation and hydrogenating the entire solution at 100–6000 p. s. i. g. and 100–600° F. in the presence of a hydrogenation catalyst, the conditions of hydrogenation being sufficiently severe to result in the conversion of said aromatic hydrocarbons to cycloparaffinic hydrocarbons.

2. A process of preparing improved petroleum resins which comprises heat soaking a steam cracked naphtha fraction having the following composition:

| | Percent by weight |
| --- | --- |
| Benzene | 5–20 |
| Toluene | 5–15 |
| Higher aromatic hydrocarbons ($C_{9-12}$) | 0–25 |
| Cyclic diolefins | 5–15 |
| Cyclic monoolefins | 5–10 |
| Aliphatic diolefins | 10–30 |
| Aliphatic monoolefins | 30–60 |
| Paraffins | 0–5 | to dimerize the cyclodienes contained therein and recovering a fraction containing less than 5% cyclodienes, polymerizing the treated steam cracked fraction to produce a resinous product, steam-stripping said resinous product to remove diluent and other volatile materials and to raise the softening point to at least about 185° F., thereafter dissolving said resin in a solvent comprising an aromatic hydrocarbon, subjecting the resin-solvent solution to hydrogenation at 100°–800° F. and 500–5000 p. s. i. g. in the presence of a group VIII metal catalyst for a time sufficient to obtain a water-white resin and to convert said aromatic hydrocarbon to a saturated hydrocarbon.

3. Process according to claim 2 in which the resin is stripped to a softening point of about 200°–225° F. under 0.5–50.0 mm. of mercury absolute prior to hydrogenation, the resin-solvent consisting essentially of toluene.

4. A method in accordance with claim 1 wherein the solvent-to-resin ratio is 3–5/1 and wherein said solvent is benzene.

5. A resinous product prepared in accordance with claim 4.

References Cited in the file of this patent

UNITED STATES PATENTS

| | | |
| --- | --- | --- |
| 2,062,845 | Thomas et al. | Dec. 1, 1936 |
| 2,734,046 | Nelson et al. | Feb. 7, 1956 |